Sept. 3, 1963 F. H. VAN WINSEN ET AL 3,102,573
AUTOMATIC PRESSURE REGULATING SYSTEM FOR AUTOMOBILE TIRES
Filed Jan. 3, 1961
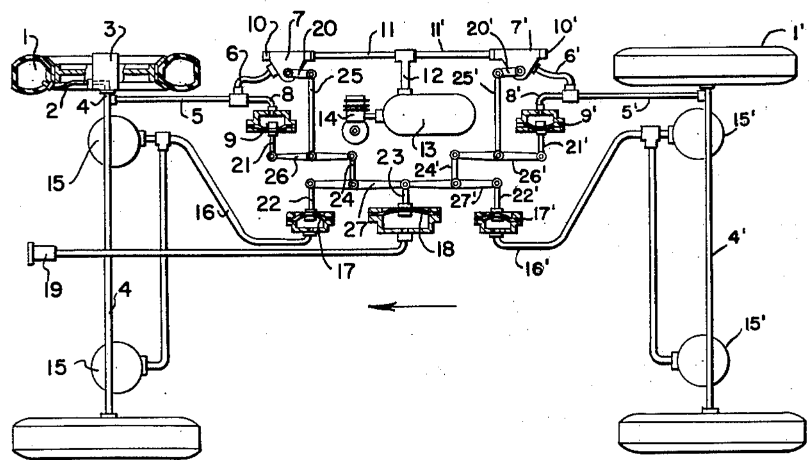
INVENTORS
FRIEDRICH H. VAN WINSEN
ARMIN DRECHSEL
BY Diike, Craig & Freudenberg
ATTORNEYS United States Patent Office 3,102,573
Patented Sept. 3, 1963

3,102,573

AUTOMATIC PRESSURE REGULATING SYSTEM FOR AUTOMOBILE TIRES

Friedrich H. van Winsen, Kirchheim (Teck), and Armin Drechsel, Stuttgart, Germany, assignors to Daimler-Benz Aktiengesellschaft, Stuttgart-Unterturkheim, Germany Filed Jan. 3, 1961, Ser. No. 80,452
Claims priority, application Germany Jan. 5, 1960
9 Claims. (Cl. 152—416)

The present invention relates to a tire pressure regulating system for vehicles, especially motor vehicles, and more particularly to an automatic pressure regulating system automatically regulating the pressure within the tires of a motor vehicle in dependence on the speed of the vehicle and the load carried thereby.

Installations are known in the prior art by means of which the driver of a motor vehicle may selectively change the tire pressure from the driver's seat, i.e., also during the drive. In these prior art installations, a switch or valve has to be manually displaced into either a filling or emptying position, an indicator instrument indicating the tire pressure has to be observed and after attaining the desired pressure the switch or valve has to be returned to the neutral position thereof. Consequently, this type of prior art construction is complicated and also dangerous during driving because of the distraction that it is likely to cause on the part of the driver from the driving duties, properly speaking. Additionally, in these prior art installations the adaption of the tire pressure to the prevailing operating conditions may also be easily overlooked or forgotten by the driver, and faulty manipulations may also occur which could lead to dangerous situations, for example, if with a relatively high speed a very small tire pressure is adjusted whereby the tires, as a result of the relatively large amount in roll-off work within a given time period, become heated excessively and may blow out. The present invention seeks to avoid these disadvantages.

More particularly, the present invention proposes an automatic tire pressure control installation in which a speed-responsive device sensing the vehicle speed or velocity adjusts a control member, connected into the pressure line between the pressure reservoir or pressure producer and the interior of the tire, with an increasing speed of the vehicle in the direction of an increase in pressure within the tire. In this manner, there is achieved an automatic matching or adaption of the tire pressure to the vehicle velocity. With harder tires the roll-off work, i.e., the work caused by relative movements of adjacent tire layers within the tire, is smaller than with relatively soft tires so that the increase in the roll-off work per time unit caused by a higher velocity and the heating of the tire connected therewith is compensated by the decrease in the roll-off work with a larger tire pressure.

The speed may be sensed, for example, by the aerodynamic pressure developed during the drive. An improvement of the control arrangement in accordance with the present invention may be achieved in that additionally an installation sensing the vehicle load adjusts the control member with an increasing vehicle load in the direction of an increase in tire pressure whereby the installation sensing the load may respond to the pressure which prevails in the pneumatic spring elements supporting the vehicle.

In particular it is proposed in accordance with the present invention to utilize as control member for the tire pressure a control valve in such a manner that the actuating member thereof with an adjustment in the one direction connects a line leading to the tire with a pressure source and with an adjustment thereof in the opposite direction connects the line leading to the tire with the atmosphere whereby the actuating member is adjusted, in turn, by a branched or multiple link system which, with an increase in load and with an increase in velocity, is moved in one direction and, with an increase in tire pressure, is moved in the opposite direction.

The control arrangement in accordance with the present invention may be refined and adapted more suitably to the particular prevailing conditions if the tire pressure for the front and rear wheels is controlled separately.

Accordingly, it is an object of the present invention to provide a control system regulating the tire pressure of pneumatic tires in motor vehicles which eliminates the inconveniences and shortcomings of the prior art systems.

Another object of the present invention resides in the provision of a control installation for automatically regulating the tire pressure within the pneumatic tires of a motor vehicle which is operative completely automatically so as to minimize faulty actuation and operation caused by human errors that may lead to dangerous driving conditions.

Another object of the present invention resides in the provision of an automatic control system in which the tire pressure is so adjusted as to compensate for changes in speed and load of the vehicle to maintain essentially constant the heating effect on the part of the tire.

Still another object of the present invention resides in the provision of a control system for automatically controlling the pressure in pneumatic tires of a motor vehicle which is responsive to the speed of the vehicle and the load carried thereby, and which automatically adjusts the pressure within the tires, preferably by regulating the front and rear wheel tires separately from each other, in such a manner that the tire pressure is automatically increased with an increase in speed and/or load and vice versa.

Still a further object of the present invention is the provision of a control system for controlling the pressure in the vehicle tires of a motor vehicle which is relatively simple in construction yet reliable in operation.

These and other objects, features and advantages of the present invention will become more obvious from the following description when taken in connection with the accompanying drawing which shows, in the single FIGURE thereof, for purposes of illustration only one embodiment according to the present invention.

Referring now to the drawing which is a schematic plan view, partially in cross-section, of one embodiment of a control system for a motor vehicle with a pneumatic spring system, reference numeral 1 designates therein the interior of a tire of any suitable construction. The interior 1 of the front wheels, i.e., the space enclosed by the tire mounted on each of the front wheels is connected through respective lines 2 leading to the corresponding wheel hubs 3 and through non-rotating lines 4 following or adjoining lines 2 with a common line 5. The common line 5 for the front wheels 1, in turn, leads through a line 6 to a control valve 7, on the one hand, and through a line 8 to a diaphragm or membrane member 9, on the other. The control valve 7 is provided with an opening 10 leading into the atmosphere and is operatively connected through lines 11 and 12 with a tank or reservoir 13 containing air under pressure which is supplied from a compressor 14. The tank 13 for the air under pressure and the compressor 14 may thereby be of any suitable known construction and include the necessary valving as is well known in the prior art. The front wheels 1 are spring-supported at the vehicle body by suitable pneumatic springs. These pneumatic springs are schematically indicated in the drawing by pneumatic bellows 15 of any appropriate construction. The interior space of these bellows 15 is connected through a line 16 with a diaphragm or membrane member 17. A membrane member 18 is loaded or actuated by the aerodynamic pressure which is dependent on the vehicle velocity and is sensed or taken off at 19 constituted, for instance, by any suitable member open in the driving direction. Of course, any other suitable speed-responsive means may be used.

The control valve 7 is actuated by a lever 20 whereby, upon swinging this lever from the illustrated central position thereof upwardly as viewed in the drawing, lines 6 and 11 are connected with each other whereas, upon swinging lever 20 in the downward direction as viewed in the drawing, the line 6 is relieved through the aperture 10. A branched linkage chain provided with push and pull transmitting members 21 through 25 and double-armed lever members 26 and 27 is operatively connected intermediate the membrane members 17 and 18, on the one hand, and the actuating lever 20 on the other.

The entire vehicle control installation is composed of a second completely symmetrical system for the rear wheels whereby the membrane member 18 influences the tire pressure of the front wheels as well as of the rear wheels. Since the control installation for the rear tires which is designated by similar primed reference numerals is identical with that of the front tires, a detailed description thereof is dispensed with herein.

*Operation*

The operation of the control installation for the front wheels according to the present invention is as follows, it being understood that the control installation for the rear wheels works in an analogous manner:

It is assumed that for the momentarily prevailing vehicle load and vehicle speed, the desired pressure prevails within the tires and therewith within the spaces 1, 2, 4, 5, 6 and 8 of the control system. If the vehicle is now loaded more heavily, then the pressure within the interior spaces of the pneumatic springs 15 increases correspondingly. As a result thereof, the membrane member 17 is moved or bent through an additional amount in the upward direction as viewed in the drawing, and, as may also be readily recognized from the drawing, the rods 22 and 24 and therewith the rod 25 are moved upwardly as a result thereof. Consequently, the actuating lever 20 is also swung upwardly and thereby permits air pressure from line 11 to reach line 6 and therewith also reach the inside 1 of the tires. The tire pressure thereby increases and the membrane member 9 is moved or bent downwardly until, as a result of such displacement and the ensuing downward movement of the rod 21, the rod 25 is again moved back downwardly to such an extent that the lever 20 again reaches the illustrated neutral position thereof. Consequently, a new equilibrium condition has been established by now. The tire pressure has been increased by a certain amount corresponding to the higher vehicle load.

An increase in vehicle velocity has an analogous effect: if the aerodynamic pressure increases at point 19 and, as a result thereof, the membrane member 18 is displaced upwardly or bent in the upward direction, the same operations are initiated as described in connection with a similar movement of the membrane member 17. The movement of the membrane member 18 also has a similar control effect on the rear wheels which is desirable since, with a velocity increase, both the front as well as the rear wheels have to be correspondingly influenced.

If the velocity becomes smaller or the vehicle load is reduced, then the operations described hereinabove take place in reverse sequence whereby the rod 25 is moved downwardly and the control valve 7 connects line 6 through the opening 10 with the atmosphere. The pressure thereby decreases within the inside of the tires whereby, as a result of a rise on the part of the membrane member 9 and a corresponding upward movement of the lever 20, a new equilibrium condition is established within the tires.

While we have shown and described one embodiment in accordance with the present invention, it is understood that the same is not limited thereto but is susceptible of many changes and modifications within the spirit and scope thereof. For example, the necessary springs and various possibilities of adjustment for the different parts of the system required for an unobjectionable and completely satisfactory operation of the control installation may be added to the system illustrated herein, such elements which may be of any known suitable construction having been omitted herein only for clarity's sake. Additionally, the control valve 7 as well as the membrane members 17, 18 and 9 may be of any suitable construction or replaced by any suitable analogous control device producing the same control effect. Similarly, the linkages interconnecting the various control members may be arranged and constructed in any known manner or replaced by any functionally equivalent structure.

Furthermore, any suitable speed-responsive means may be used for the speed-responsive means 18 and 19 illustrated herein. Similarly, any suitable load-responsive device may be utilized in lieu or in the absence of the pneumatic spring elements 15.

Thus, it is quite obvious that the present invention is susceptible of many changes and modifications within the spirit and scope thereof and we, therefore, do not wish to be limited to the details shown and described herein, but intend to cover all such changes and modifications as are encompassed by the scope of the appended claims.

We claim:

1. An automatic control installation adapted to control the tire pressure also during the drive for vehicles having pneumatic spring means, comprising supply means providing air under pressure, means operatively connecting said supply means with the insides of the tires including control means for selectively connecting the insides of the tires with said supply means or with the atmosphere, and actuating means for automatically actuating said control means including speed-responsive means responsive to the vehicle speed, load-responsive means responsive to the pressure within said pneumatic spring means and means operatively connecting speed-responsive means and said load-responsive means with said control means for actuating said control means in such a manner as to produce an increase in the tire pressure with an increase in the vehicle speed and with an increase in the vehicle load.

2. An automatic control installation as defined in claim 1, wherein said speed-responsive means includes means responsive to the aerodynamic pressure of the vehicle.

3. An automatic control installation for vehicles adapted to control the tire pressure of the front and rear tires of a vehicle having pneumatic spring means, comprising supply means providing pressurized air for said tires, and separate control means for the front and rear tires, respectively, and operative to selectively connect the insides of the tires with said supply means or with the atmosphere including speed-responsive means common to both control means for the front and rear tires and responsive to the vehicle speed, separate load-responsive means for the front and rear tires, respectively, responsive to the pressure within said pneumatic spring means, and means operatively connecting said speed responsive means and each of said load-responsive means with a corresponding one of said control means for actuating said control means in such a manner as to produce an increase in the tire pressure of both front and rear tires with an increase in the vehicle speed and to produce selectively an increase in tire pressure of the front and rear tires, respectively, with an increase in the vehicle load as determined by a corresponding load-responsive means.

4. An automatic control installation for vehicles, especially motor vehicles adapted to control the tire pressure, comprising supply means providing pressurized air, connecting means operatively connecting said supply means with the insides of the front and rear tires, said last-mentioned means including control valve means for selectively connecting the insides thereof with said supply means or with the atmosphere, actuating means for said control means, speed-responsive means responsive to the vehicle speed, tire-pressure sensing means, load-responsive means responsive to the load of the vehicle, and multiple link means operatively connecting said speed-responsive means and said load-responsive means as well as said tire-pressure sensing means with said actuating means in such a manner that, with an increase in speed or in load, said actuating means is displaced in one direction to thereby connect said supply means with the respective tire insides and therewith increase the tire pressure and that, with a decrease in speed or in load, said actuating means is displaced in the opposite direction to thereby connect the respective tire insides with the atmosphere and therewith reduce the tire pressure while with an increase in the tire pressure said actuating means is displaced by said tire-pressure sensing means in said other direction and with a tire pressure decrease in said one direction.

5. An automatic control installation for vehicles, especially motor vehicles having pneumatic spring means, adapted to control the tire pressure, comprising supply means providing presurized air, connecting means operatively connecting said supply means with the insides of the front and rear tires, said last-mentioned means including control valve means for selectively connecting the insides thereof with said supply means or with the atmosphere, actuating means for said control means, speed-responsive means responsive to the vehicle speed, tire-pressure sensing means, load-responsive means responsive to the load as determined by respective spring means of the vehicle, and multiple link means operatively connecting said speed-responsive means and said load-responsive means as well as said tire-pressure sensing means with said actuating means in such a manner that, with an increase in speed or in load, said actuating means is displaced in one direction to thereby connect said supply means with the respective tire insides and therewith increase the tire pressure and that, with a decrease in speed or in load, said actuating means is displaced in the opposite direction to thereby connect the respective tire insides with the atmosphere and therewith reduce the tire pressure while with an increase in tire pressure said actuating means is displaced by said tire-pressure sensing means in said other direction and with a tire pressure decrease in said one direction.

6. An automatic control installation for vehicles, especially motor vehicles adapted to control the tire pressure of the front and rear tires, comprising supply means providing pressurized air, connecting means operatively connecting said supply means with the insides of the front and rear tires, said last-mentioned means including separate control valve means for the front and rear tires, respectively, for selectively connecting the insides thereof with said supply means or with the atmosphere, actuating means for said control means, speed-responsive means responsive to the vehicle speed, separate tire-pressure sensing means for each of the front and rear tires, respectively, separate load-responsive means responsive to the load of the front and rear tires, respectively, of the vehicle, and multiple link means operatively connecting said speed-responsive means and said load-responsive means as well as said tire-pressure sensing means with said actuating means in such a manner that, with an increase in speed or in load, said actuating means is displaced in one direction to thereby connect said supply means with the respective tire insides and therewith increase the tire pressure and that, with a decrease in speed or in load, said actuating means is displaced in the opposite direction to thereby connect the respective tire insides with the atmosphere and therewith reduce the tire pressure while with an increase in tire pressure said actuating means is displaced by said tire-pressure sensing means in said other direction and with a tire pressure decrease in said one direction.

7. An automatic control installation for vehicles, especially motor vehicles having pneumatic spring means, adapted to control the tire pressure of the front and rear tires, comprising supply means providing pressurized air, connecting means operatively connecting said supply means with the insides of the front and rear tires, said last-mentioned means including separate control valve means for the front and rear tires, respectively, for selectively connecting the insides thereof with said supply means or with the atmosphere, actuating means for said control means, speed-responsive means responsive to the vehicle speed and common to both of said control means, separate tire-pressure sensing means for each of the front and rear tires, respectively, separate load-responsive means responsive to the load as determined by respective spring means of the front and rear tires, respectively, of the vehicle, and multiple link means operatively connecting said speed-responsive means and said load-responsive means as well as said tire-pressure sensing means with said actuating means in such a manner that, with an increase in speed or in load, said actuating means is displaced in one direction to thereby connect said supply means with the respective tire insides and therewith increase the tire pressure and that, with a decrease in speed or in load, said actuating means is displaced in the opposite direction to thereby connect the respective tire insides with the atmosphere and therewith reduce the tire pressure while with an increase in tire pressure said actuating means is displaced by said tire-pressure sensing means in said other direction and with a tire pressure decrease in said one direction.

8. An automatic control installation for vehicles, especially motor vehicles adapted to control the tire pressure, comprising supply means providing pressurized air, connecting means operatively connecting said supply means with the insides of the front and rear tires, said last-mentioned means including control valve means for selectively connecting the insides thereof with said supply means or with the atmosphere, actuating means for said control means, speed-responsive means responsive to the vehicle speed, tire-pressure sensing means, load-responsive means responsive to the load of the vehicle, and means operatively connecting said speed-responsive means and said load-responsive means as well as said tire-pressure sensing means with said actuating means in such a manner that, with an increase in speed or in load, said actuating means is displaced in one direction to thereby connect said supply means with the respective tire insides and therewith increase the tire pressure and that, with a decrease in speed or in load, said actuating means is displaced in the opposite direction to thereby connect the respective tire insides with the atmosphere and therewith reduce the tire pressure while with an increase in the tire pressure said actuating means is displaced by said tire-pressure sensing means in said other direction and with a tire pressure decrease in said one direction.

9. An automatic control installation for vehicles, especially motor vehicles having pneumatic spring means, adapted to control the tire pressure of the front and rear tires, comprising supply means providing pressurized air, connecting means operatively connecting said supply means with the insides of the front and rear tires, said last-mentioned means including separate control valve means for the front and rear tires, respectively, for selectively connecting the insides thereof with said supply means or with the atmosphere, actuating means for said control means, speed-responsive means responsive to the vehicle speed and common to both of said control means, separate tire-pressure sensing means for each of the front and rear tires, respectively, separate load-responsive means responsive to the load as determined by respective spring means of the front and rear tires, respectively, of the vehicle, and means operatively connecting said speed-responsive means and said load-responsive means as well as said tire-pressure sensing means with said actuating means in such a manner that, with an increase in speed or in load, said actuating means is displaced in one direction to thereby connect said supply means with the respective tire insides and therewith increase the tire pressure and that, with a decrease in speed or in load, said actuating means is displaced in the opposite direction to thereby connect the respective tire insides with the atmosphere and therewith reduce the tire pressure while with an increase in tire pressure said actuating means is displaced by said tire-pressure sensing means in said other direction and with a tire pressure decrease in said one direction.

References Cited in the file of this patent

UNITED STATES PATENTS

| | | |
|---|---|---|
| 1,585,833 | Down | May 25, 1926 |
| 1,988,671 | Stout | Jan. 22, 1935 |
| 2,778,656 | May | Jan. 22, 1957 |